Figures 1, 2, 3:
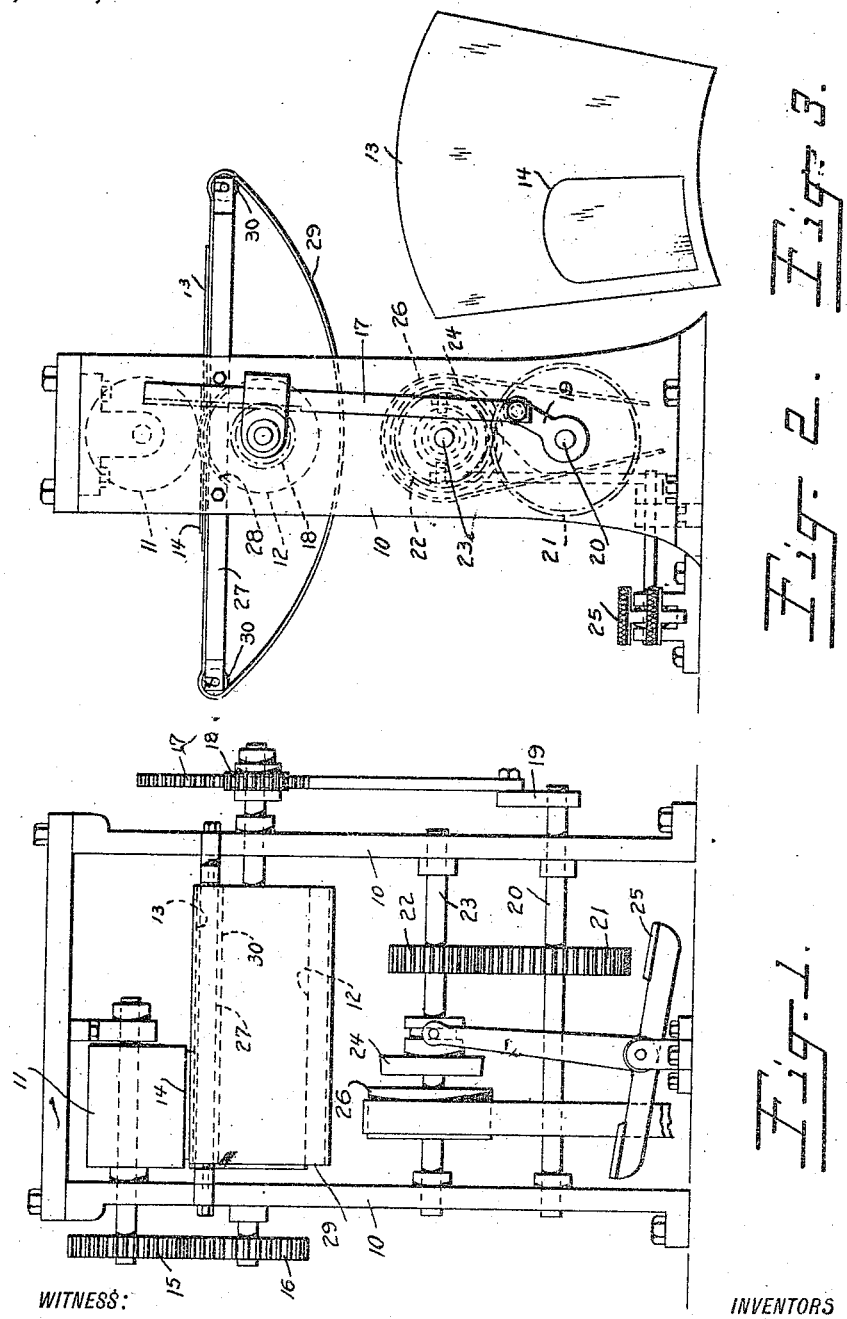

F. HADFIELD & W. KUHLTHAU.
ROLLING MACHINE.
APPLICATION FILED MAY 18, 1916.

1,210,930.

Patented Jan. 2, 1917.

WITNESS:
S. Taylor

INVENTORS
Frederick Hadfield
and William Kuhlthau,
BY
Ernest Hopkinson
ATTORNEY

UNITED STATES PATENT OFFICE.

FREDERICK HADFIELD, OF MILLVILLE, AND WILLIAM KUHLTHAU, OF BLACKSTONE, MASSACHUSETTS, ASSIGNORS TO WOONSOCKET RUBBER COMPANY, A CORPORATION OF RHODE ISLAND.

ROLLING-MACHINE.

1,210,930.  Specification of Letters Patent.  Patented Jan. 2, 1917.

Application filed May 18, 1916. Serial No. 98,291.

*To all whom it may concern:*

Be it known that we, FREDERICK HADFIELD and WILLIAM KUHLTHAU, citizens of the United States, residing at Millville and Blackstone, respectively, in the county of Worcester and State of Massachusetts, have invented certain new and useful Improvements in Rolling-Machines, of which the following is a full, clear, and exact description.

This invention relates to rolling machines, and has for an object to provide a machine for rolling reinforcements upon materials to be used in the manufacture of rubber articles, more particularly rubber boots.

In the manufacture of rubber boots, it has been found that while undergoing vulcanization, particularly under the differential of pressure process cure, separation of some of the rubber parts takes place. To prevent this, it is necessary that such parts be rolled down forcibly into intimate contact with each other so that the raw rubber surfaces of the parts will be worked together. To accomplish this quickly and effectively, this invention provides a rolling machine in which the parts of the boot, superposed upon each other, will be fed a number of times back and forth between rollers while supported in flat condition upon a conveyer belt which keeps the raw rubber clean or uncontaminated by any substance which later might prevent proper adhesion of the various parts of the boot while the same is being built and vulcanized.

The invention can be readily understood from the following description read in connection with the accompanying drawing, in which—

Figure 1 is a front elevation of a rolling machine constructed in accordance with the invention. Fig. 2 is an end elevation of the machine. Fig. 3 is a plan view showing the boot skirt and knee patch ready for rolling.

Referring now to the drawing, in which like characters of reference designate similar parts, 10 designates the frame of the machine. Superposed rollers 11 and 12 are journaled in suitable bearings on the frame, the upper roller being considerably shorter than the lower roller so that only that portion of the rubber boot skirt 13 to which the rubber reinforcing patch 14 is to be applied, will be pressed between the rollers. The rollers are geared together by gear wheels 15 and 16 and rotate oppositely to each other.

For rotating and then reversing rotation of the rollers so that the rubber materials will be passed back and forth a number of times between them, a rack 17 is mounted on the frame and engages a pinion 18 which is fixed to the shaft of the lower roller. The rack is reciprocated by a crank arm 19 which is fixed to a shaft 20, the latter being driven by meshing gear wheels 21 and 22 from a drive shaft 23. A friction clutch 24 and pedal 25 serve to connect and disconnect the drive shaft from a drive pulley 26.

To support the rubber materials in flat condition during the rolling operation and thus minimize distortion of the soft raw rubber, a table 27 is supported by the frame in horizontal position, and is provided with an opening 28 to permit the upper portion of the lower roller 12 to project slightly through it.

In order to keep the raw rubber parts clean and free from contamination by any substance which might later prevent proper adhesion of the parts with contiguous parts of the boot while the same is being built and vulcanized, a conveyer belt 29 is trained over idlers 30 upon the ends of the table, and passes between the rollers, the belt being supported in flat condition by the table and being frictionally pressed against the projecting upper portion of the lower roller by the material being rolled. The belt thus is frictionally driven by the lower roller, first in one direction and then in the reverse direction and supports and carries the rubber parts back and forth a number of times between the rollers during the rolling operation.

In operation, the raw rubber skirt 13, and the raw rubber reinforcing patch 14, are superposed to lightly adhere to each other, and the product is then placed upon the conveyer belt with the patched portion of the skirt lying between the rollers 11 and 12 and with the main portion of the skirt lying beyond the end of the upper roller 11. The machine is now started, whereupon the rollers will be rotated and then the rotation thereof reversed so that the belt, which as above stated bears upon and is frictionally driven by the lower roller 12, will support and carry the skirt first in one direction and then in the reverse direction until the contacting raw rubber surfaces of the patch and skirt are worked together by the pressure of the rollers. The machine is then stopped and the rolled product removed.

Having thus described our invention, what we claim as new and desire to protect by Letters Patent is:—

1. A rolling machine comprising rollers disposed opposite each other, means for rotating and then reversing rotation of the rollers, and a conveyer belt between the rollers for supporting the materials operated upon by the rollers.

2. A rolling machine comprising rollers disposed opposite each other, means for rotating and reversing rotation of the rollers, and a conveyer belt between the rollers frictionally driven by one of the rollers to support and carry the materials operated upon by the rollers first in one direction and then in the reverse direction.

3. A rolling machine comprising rollers disposed one above the other, means for rotating and reversing rotation of the rollers, a table through which the upper portion of the lower roller projects, and a conveyer belt supported in flat condition by the table and frictionally driven by contact with the upper portion of the lower roller.

Signed at Millville, Massachusetts, this 13th day of May, 1916.

FREDERICK HADFIELD.
WILLIAM KUHLTHAU.